United States Patent [19]

Jones et al.

[11] Patent Number: 4,669,984
[45] Date of Patent: Jun. 2, 1987

[54] LIGHT DOT MATRIX GAME ASSEMBLY

[75] Inventors: Lawrence T. Jones, Los Angeles; Anson Sims, Granada Hills, both of Calif.

[73] Assignee: California R & D Center, Culver City, Calif.

[21] Appl. No.: 827,330

[22] Filed: Feb. 7, 1986

[51] Int. Cl.⁴ .............................................. G09B 11/06
[52] U.S. Cl. ...................................................... 434/85
[58] Field of Search ......................... 434/85, 153, 408

[56] References Cited

U.S. PATENT DOCUMENTS 2,044,760  6/1936  Anderson .............................. 434/85
2,191,109  2/1940  Kittredge ............................ 434/153
2,891,314  6/1959  Haschek .......................... 434/153 X
3,055,113  9/1962  Grandjean .......................... 434/408
3,665,610  5/1972  Schlau et al. ..................... 434/85 X Primary Examiner—William H. Grieb
Attorney, Agent, or Firm—Price, Gess & Ubell

[57] ABSTRACT

An improved toy drawing assembly is provided by a light table assembly, a pair of indexing systems along two perpendicular axes in the table assembly, a pair of selector elements and arm elements for transferring a preselected sequence of two-dimensional coordinates from a code book onto a writing material placed on the light table.

17 Claims, 5 Drawing Figures

LIGHT DOT MATRIX GAME ASSEMBLY

BACKGROUND OF THE INVENTION

1. Field of the Invention

The present invention generally relates to toys for drawing two-dimensional pictures and, more specifically, to an improved toy drawing assembly that allows a child to transfer two-dimensional coordinates onto a light table assembly and thereby reproduce two-dimensional pictures.

2. Brief Description of the Prior Art

One drawing toy for young children that has been in existence for many years is a drawing book that has sequentially numbered dots on each page of the book that represents a picture. The child draws a line from the first numbered dot to the second numbered dot and continues on in sequence until all of the numbered dots have been connected by the line. Connecting all the dots by the line produces a picture. While this game provides a certain degree of play for children, one shortcoming is that children can often recognize the picture without having to draw a line that connects all the dots. A further shortcoming is that there is essentially only one aspect of play, i.e., connecting the dots.

Another drawing toy that has been in existence is referred to as an Etch A Sketch. It enables a child to draw a continuous line over the viewing screen. Two control knobs are provided for simultaneously controlling the drawing of the line along the x and y axes. While this toy enables a child to draw freely, at least one shortcoming is that lines, other than lines parallel to the x or y axes, are difficult to produce. Drawing a figure that includes curved lines or lines not parallel to the x or y axis becomes a very difficult task, and frustrates the child. In addition, the toy is limited by the fact that any figure drawn cannot be saved for later enjoyment if the child wishes to draw another figure. The first figure must be erased from the screen before the next one is drawn.

There is still a need in the toy field for an improved toy drawing assembly that provides types and combinations of play action that are in addition to and different from those in the prior art and that can hold the interest of children.

SUMMARY OF THE INVENTION

One object of the present invention is to provide an improved toy drawing assembly that produces a two-dimensional picture.

Another object of the present invention is to allow a child to produce a two-dimensional drawing and retain it for future enjoyment.

Also, an object of the present invention is to provide a dimension of play whereby the child produces a two-dimensional light dot matrix.

A further object of the present invention is to add a dimension of play whereby the child reproduces an unknown predrawn picture onto a writing material.

The preferred embodiment of the present invention accomplishes these objects by providing, among other things, a light table assembly, an x-coordinate indexing system along a first axis in the table assembly and a y-coordinate indexing system along a second axis in the table assembly, each system having a sequence of indices different from the other, a pair of selector elements for selecting an index in each system, and a pair of selector arm elements for transferring a preselected sequence of two-dimensional coordinates from a code book onto a writing material placed on the light table assembly. These and other objects of the present invention will be evident from examining the drawings, specification, and claims attached hereto.

DETAILED DESCRIPTION OF THE PREFERRED EMBODIMENT

The following description is provided to enable any person skilled in the electrical and mechanical toy fields to make and use the present invention, and sets forth the best modes contemplated by the inventor of carrying out his invention. Various modifications, however, will remain readily apparent to those skilled in the art, since the generic principles of the present invention have been defined herein specifically to provide an improved toy drawing assembly.

Figure 1:
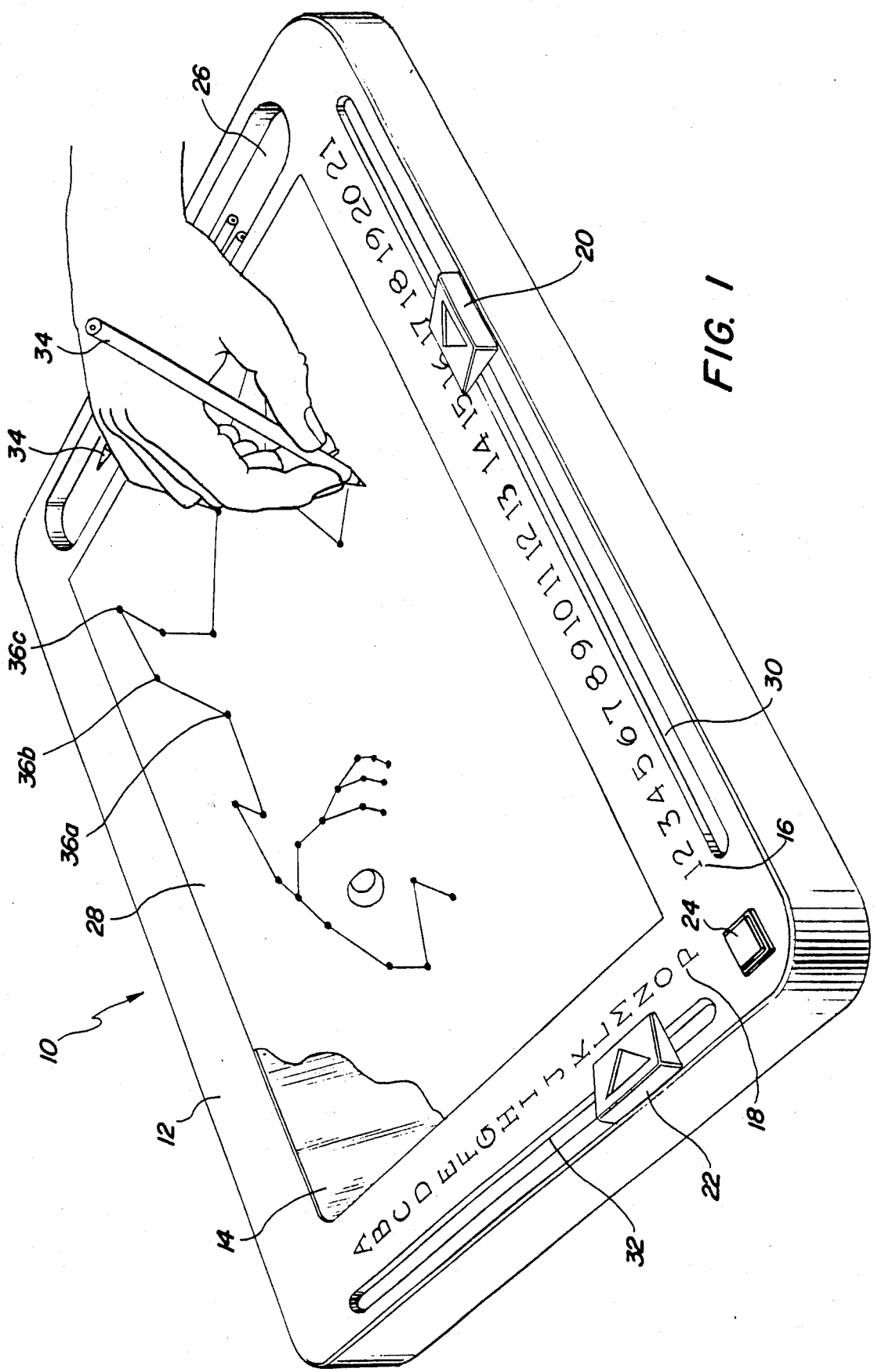
FIG. 1 is a perspective view of the preferred embodiment of the present invention.

In FIG. 1, a light table assembly 10 is provided and structured like that of an artist's light table. A housing assembly 12 comprises a portion of the light table assembly 10 and is a generally rectangular shaped box element, preferably of a hard plastic material, having a cavity therein for housing and supporting certain elements of the present invention described below. One of the two larger faces of the housing assembly 12 serves as the top side of the light table assembly 10 and has a rectangular shaped window or opening formed therein (not shown) so that the distance between the edge around the window and the edge around the top side is approximately equidistant at all points thereat. A top element 14 is held in a recess in the top side along the edge of the window to enable the top element 14 to remain over the window. The top element 14 is a flat planar element preferably made of a translucent material, such as glass or plastic, that allows a light beam to be projected from within the housing assembly 12 and through the top element 14 as discussed below. The top element 14 is also rectangular shaped like that of the window and of a size slightly larger than the window. The surface of the top element 14 allows the child to place a writing material 28, such as paper, on it for drawing a picture in the manner below.

A tray element 26 is a recess formed in the top side of the housing assembly 12 at a position between the right side edge thereof and the right side edge of the top element 14, as viewed in FIG. 1. The tray element 26 is preferably elongated in shape and of a length adequate to hold a plurality of writing instruments or pencils 34, as depicted in FIG. 1.

Two coordinate indexing systems are provided in the light table assembly 10. One is an x-coordinate indexing system 16 positioned along an x axis that lies near the bottom edge of the top side of the housing assembly 12, as viewed in FIG. 1. A y-coordinate indexing system is similarly provided along a y axis that lies near the left side of the housing assembly 12, as viewed in FIG. 1. The x and y axes intersect at generally a point in the top side defined by the position of a light switch 24 described in more detail below. The x-coordinate indexing system 16 includes a sequence of indices that extend from the left end of the x axis near the intersection with the y axis and towards the right end of the x axis. In this preferred embodiment, the indices of the indexing system 16 are described by sequential numerals 1 through 21, inclusive, in an equal spaced apart relationship. Similarly, the y-coordinate indexing system 18 includes a sequence of indices that extend from the top end of the y axis towards the bottom end thereof which intersects the x axis. The indices are preferably described by sequential alphabetical letters from A through P, inclusive, in an equal spaced apart relationship.

As can be appreciated in view of the discussion below, the particular symbols used in either x-indexing system 16 or the y-indexing system 18 need not be limited to the particular symbols disclosed herein. The symbols, however, need to be distinguishable from each other within one system and as between the two systems. Further, it is contemplated that the particular number of symbols within each system can be less or more than that disclosed.

Adjacent the indices in the x-indexing system 16 is in elongated shaped x-aperture 30 formed in the top side of the housing assembly 12. Slidably disposed within the x-aperture 30 is a first selector element 20 which, in this embodiment, is a rectangular shaped element having a triangular shaped design on the top surface thereof. The apex of the triangular design is positioned to enable it to be adjacent an index in the indexing system 16 as a child slides the first selector element 20 along the x-aperture 30. A post member or element (not shown) extends from the bottom side of the element 20 and is rigidly fixed to a first selector arm 42, as mentioned below.

Similarly, an elongated y-aperture 32 is formed in and extends along the left edge of the top side of the housing assembly 12 and is adjacent the indexing system 18. A second selector element 22 shaped and configured like that of the first selector element 20 is also slidably disposed within the y-aperture 32 and rigidly fixed to a second selector arm 46.

Figure 5:
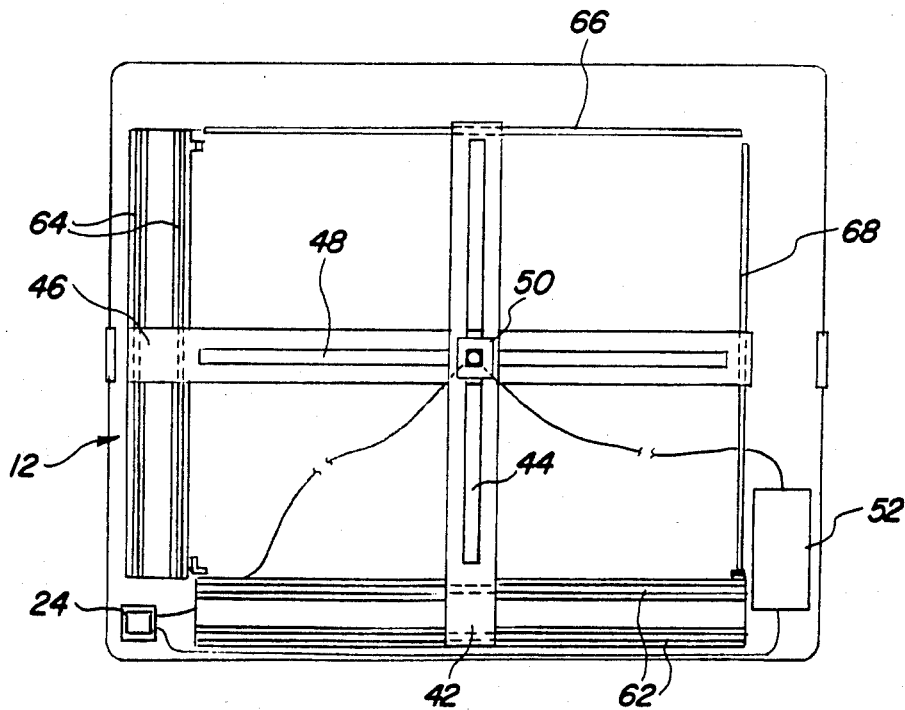
FIG. 5 is a sectional view taken about line 5—5 of FIG. 1 (reduced scale).

Referring to FIG. 5, as noted above, the first selector element 20 is rigidly fixed by its post member to one end of the first selector arm 42 disposed within the housing assembly 12. The arm 42 is preferably an elongated, rectangular shaped element having an elongated first slot or aperture 44 that extends almost along the entire longitudinal length of the arm 42. The end of the first selector arm 42 which is fixed to the first selector element 20 is slidably engaged to a pair of first guides 62 that are stationarily fixed within the housing assembly 12. Each guide 62 is a rigid, elongated element positioned parallel to each other and the x axis and extends slightly more than the length of the x-aperture 30. Each guide 62 is further configured in an appropriate conventional manner, such as a groove along its longitudinal axis, to enable it to support and slidably hold the first selector arm 42 along the entire longitudinal length of the guide 62.

The end of the first selector arm 42 which is opposite the guides 62 is also supported by and slidably connected to a first support element 66 in any appropriate conventional manner. The first support element 66 is preferably an elongated, rod shaped element rigidly fixed to the housing assembly 10 and positioned parallel to the guides 62.

Likewise, a second selector arm 46 is provided within the housing assembly 12 and disposed just below the first arm 42. The second arm 46 forms a second slot or aperture 48 that extends along almost the entire longitudinal length thereof. One end of the second selector arm 46 is stationarily fixed to the second selector element 22, which end is also supported and slidably held to a pair of second guides 64, like first guides 62, which extend along the y axis. The other end of the second selector arm 46 is supported by and slidably connected to a second support element 68, like first support element 66, which extends parallel to the second guides 64. Consequently, the first arm 42 and second arm 46 remain perpendicular to each other while sliding along their respective guide and support elements. A pin element (not shown) or some other suitable means is provided to extend through the respective slots of the first arm 42 and second arm 46 for slidably connecting the arms to each other. Each arm thereby remains perpendicular to the other but is free to move along its respective axis regardless of the position of the other arm along its respective axis. For example, if the arm 46 is moved along the y axis, the pin element remains stationary in the slot 48 of the arm 46 but slides along the slot 44 of the arm 42 whereby the arm 42 remains stationary. In this manner, the point of intersection of the first arm 42 and second arm 46 can be moved to all coordinates 40 (described below) in the plane defined between the x and y axes.

Figure 3:
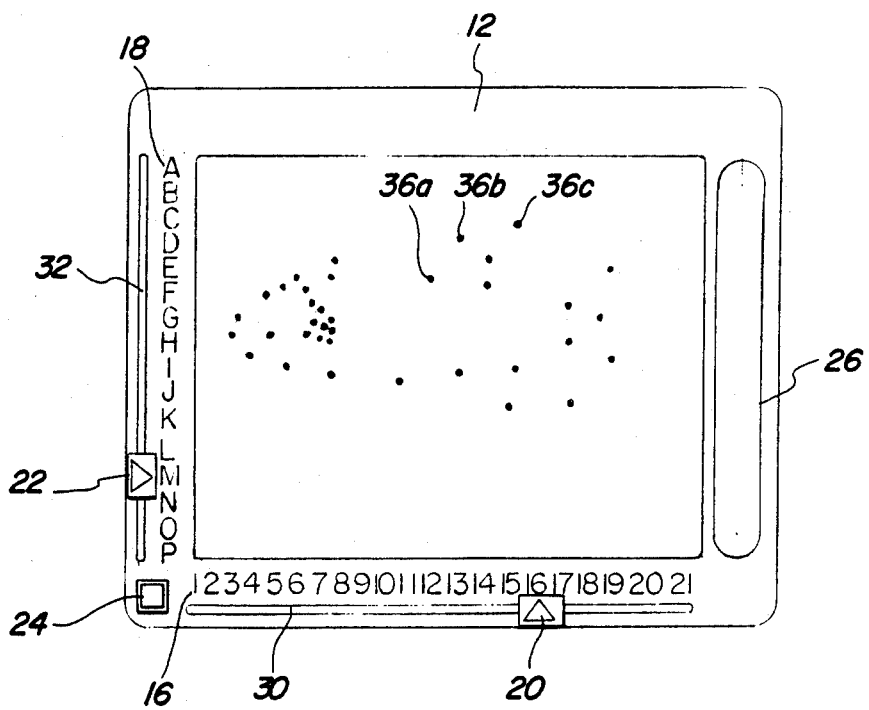
FIG. 3 is a top view of the present invention showing a plurality of light dots being produced in sequence (reduced scale)

A light bulb 50 is stationarily fixed on the pin element and powered by a power source 52 which preferably comprises a set of chemical activated batteries. The power source 52 is disposed in the housing assembly 12 as shown in FIG. 5 near the end of the x axis opposite the intersection with the y axis. The light bulb 50 is of any appropriate conventional design to provide a light beam having a restricted collimated form with enough energy to pass through the top element 14 and writing material 28 and thereby produce a plurality of light dots 36 as shown in FIG. 3. The light bulb 50 is activated upon the child activating a light switch 24 which is disposed in the housing assembly 12 near the intersection of the x and y axes. After a momentary activation of the light bulb 50, the bulb becomes deactivated. The continuing activation and deactivation of the light bulb 50 as described below is depicted in FIG. 3.

Figure 2:
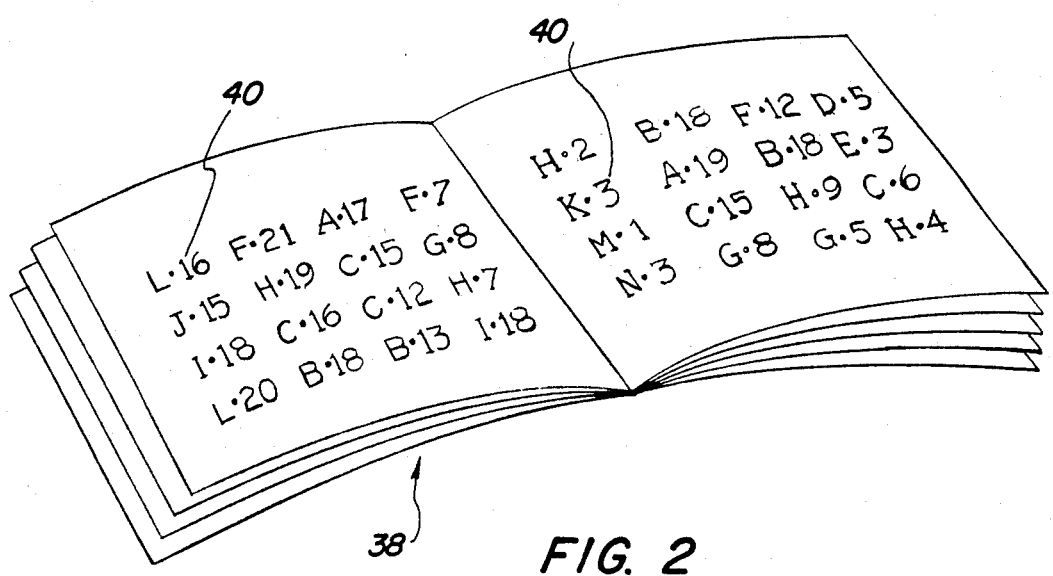
FIG. 2 is an elevated, front view of the code book opened to expose a sequence of coordinates.

The positioning of the first arm 42 and the second arm 46 and thus the positions of the light dots 36 are preferably determined by a code book 38, as in FIG. 2, which contains a plurality of two-dimensional pictures described by prearranged sequences of two-dimensional coordinates 40. Each coordinate 40 contains two coordinate references, one along the x axis and another along the y axis. Each x coordinate in the coordinate 40 corresponds to one index in the x-coordinate indexing system. Likewise, each y-coordinate in the coordinate 40 corresponds to one index in the y-coordinate indexing system 18. The code book 38 allows the user to select a prearranged sequence, sequentially read the coordinates 40 in the sequence, transfer each coordinate 40 to the x-coordinate indexing system 16 and the y-coordinate indexing system 18, and to then draw a picture in the manner described below.

Figure 4:
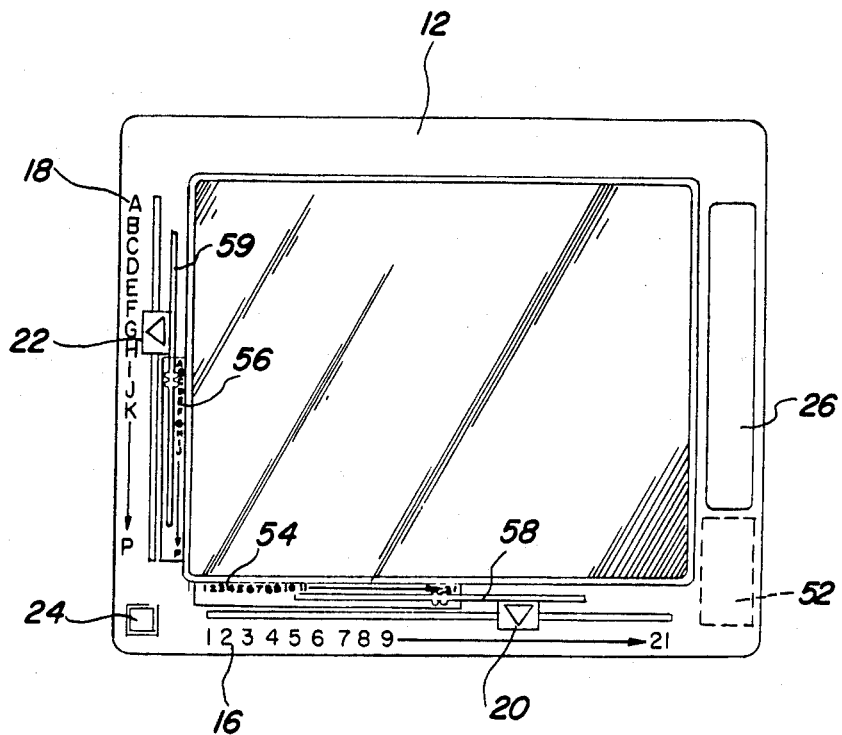
FIG. 4 is a top view of a second preferred embodiment of the present invention showing four indexing systems (reduced scale)

In another preferred embodiment of the invention, as shown in FIG. 4, rather than only two coordinate indexing systems being provided, four systems are provided. In this second referred embodiment, the x-indexing system 16 and the y-indexing system 18 are provided, as in the first embodiment above. In addition, a reduced x-indexing system 54 is provided parallel to and adjacent the x-indexing system 16. The two systems are identical, except that the reduced system 54 is on a reduced scale, i.e., the indices are in a closer spaced apart relationship than that in the x-coordinate indexing system 16. In addition, a third selector element 58 is provided to serve a purpose similar to that of the first selector element 20. The third element 58 is a generally rod shaped element stationarily fixed to the first selector arm 42, like that of first selector element 20, and slidably moves along in an elongated aperture (not shown) adjacent the reduced x-indexing system 54.

The y-coordinate indexing system similarly has a complementary reduced y-indexing system 56 and a fourth selector element 59, both of which are similar to that of the reduced indexing system 54 and the third selector element 58. However, the fourth selector element 59 is stationarily fixed to the second selector arm 46.

When using the present invention, a child opens the code book 38 to a prearranged sequence of coordinates 40 that portray a picture. Each coordinate 40 is read by the child in sequence. For example, in FIG. 2, the first coordinate 40 in sequence is L.16. The child moves the first selector element 20 to a position opposite the letter "L" in the y-coordinate indexing system 18. In so doing, the second selector arm 46 slides along the pair of second guides 64 and second support element 68 to a position along the y axis particularly defined by an "L" coordinate thereon. The first selector arm 42 remains stationary, since the pin element remains stationary in the arm 46, but slides along the slot 44 of the first arm 42.

Next, the child slides the first selector element 20 to the position "16" in the x-coordinate indexing system. The first selector arm 42 is thereby slidably moved along the first guides 62 and first support element 66 while the second arm 46 reamins stationary. Thereupon, the child activates the light switch 24 to momentarily illuminate the light bulb 50. The light bulb 50 thereby produces a light beam into the top element 14 so that the child sees, for example, a light dot 36a in the writing material 28 positioned on the top element 14, as in FIG. 3. The child then marks with a pencil 34, or other writing instrument, a dot on the material 28 over the light dot 36a. The light bulb 50 then becomes deactivated and the light dot 36a disappears.

The child reads the next coordinate 40 in sequence and accordingly moves the first selector element 20 and second selector element 22, activates the light switch 24 and thereby produces, for example, a light dot 36b, as shown in FIG. 3, and marks a dot thereat on the writing material 28. The light dot 36b will disappear and the child then draws a line from the dot marked at light dot 36a to the dot marked at light dot 36b as in FIG. 1. The transformation of the coordinates 40 from the code book 38 to the light table assembly 10 continues and thereby produces a light dot 36c as in FIG. 3. The child continues through the sequence of coordinates 40 and continues to connect each dot marked at each light dot 36 to the next dot marked at the next light dot 36 produced in sequence. Finally, after all the light dots 36 have been connected in sequence by a line drawn the child, a two-dimensional picture is produced upon the writing material 28 as in FIG. 1.

The same picture as above can be produced on a smaller scale by utilizing the reduced x-indexing system 54 and reduced y-indexing system 56 in the same manner as the indexing systems 16 and 18.

It should be understood, of course, that the foregoing relates to a preferred embodiment of the invention and that modifications may be made without departing from the spirit and scope of the invention as set forth in the following claims, wherein:

I claim:

1. An improved toy drawing assembly, the improvement comprising:
   a light table assembly having a translucent top element in a housing assembly;
   a power source;
   means for selecting two-dimensional coordinates from a pre-arranged sequence of two-dimensional coordinates that are separate from the light table assembly, the pre-arranged sequence of coordinates portraying a picture;
   means for transferring each selected coordinate onto the light table assembly, including a first coordinate indexing system along a first axis in the table assembly and a second coordinate indexing system along a second axis in the table assembly, each system having a sequence of indices and a selection element movable along the indexing system and fixed to a locator arm element that is joined to the light table, the arm elements of each system being joined to each other;
   a light source disposed at the point of joining of the locator arm elements and powered by the power source; and
   means for activating the light source upon each transfer of coordinates onto the light table assembly.

2. The invention of claim 1 wherein the indices in their respective sequence of indices are different from one another.

3. The invention of claim 2 wherein the indices in their respective sequence of indices are different from the indices in the other sequence of indices.

4. The invention of claim 3 wherein each selected coordinate has a corresponding index in each sequence of indices.

5. The invention of claim 1 wherein each sequence of indices is positioned adjacent the top element in the table assembly.

6. The invention of claim 1 wherein the locator arm elements lie in a plane parallel to the top element and are disposed within the housing assembly.

7. An improved toy drawing assembly for reproducing a two-dimensional picture, the improvement comprising:
   a light table assembly having a translucent top element in a housing assemly;
   a power source;
   means for sequentially selecting each coordinate in a pre-arranged sequence of two-dimensional coordinates, which in the aggregate portray the picture, the means being separate from the light table assembly;
   means for transferring each sequentially selected coordinate into the light table assembly, including a first coordinate indexing system along a first axis in the table assembly and a second coordinate indexing system along a second axis in the table assembly, each system having a sequence of indices, the indices in each sequence being different from one another and different from the indices in the other sequence, a pair of selector elements for selecting one index at a time in its respective indexing system, and a pair of locator arm elements each fixed to a respective selector element for reproducing the selection of an index, the arm elements being disposed perpendicular to each other and joined to each other within the housing assembly;

a light source disposed at the point of joining of the locator arm elements and powered by the power source; and means for activating the light source upon each transfer of a coordinate onto the light table assembly.

8. The invention of claim 7 wherein the two-dimensional coordinates represent coordinates along an x-axis and a y-axis, the two axes being perpendicular to each other.

9. The invention of claim 8 wherein the first and second axes lie along an x-axis and a y-axis, respectively, in the housing assembly.

10. The invention of claim 7 wherein the indices in each sequence of indices is linearly positioned along its respective first or second axis.

11. The invention of claim 10 wherein the indices in each sequence are in an equally spaced apart relationship.

12. The invention of claim 11 further comprising a third indexing system and a fourth indexing system, each system having a sequence of indices identical, respectively, to either the first or second systems, and in spaced apart relationships identical to each other but different from that of the first and second systems.

13. An improved toy drawing assembly for reproducing a plurality of pre-drawn two-dimensional pictures onto a material suitable for writing, the improvement comprising:

a light table assembly having a translucent top element in a housing assembly and upon which the writing material can be placed;

a power source;

means for sequentially selecting all of the paired coordinates from one of a plurality of sequences of pre-arranged pairs of x and y coordinates, each sequence portraying a pre-drawn picture different from one another, the means being separate from the light table assembly;

means for transferring each sequentially selected x-coordinate in the paired coordinate onto the light table, including an x-coordinate indexing system having a first sequence of indices positioned along an x-axis in the housing assembly with each index being different from the others, a first selector element disposed in a first aperture formed in the housing assembly for selecting one index at a time from the first sequence of indices, and a first selector arm having an elongated aperture, the arm being disposed below the translucent top element within the housing assembly and rigidly fixed to the first selector element for reproducing the selection of an index;

means for transferring each sequentially selected y-coordinate in the paired coordinate onto the light table, including a y-coordinate indexing system having a second sequence of indices positioned along a y-axis in the housing assembly that is perpendicular to the x-axis with each index being different from the other and different from the indices in the first sequence, a second selector element disposed in a second aperture formed in the housing assembly for selecting one index at a time from the second sequence of indices, and a second selector arm having an elongated aperture, the arm being disposed below the translucent top element within the housing assembly, rigidly fixed to the second selector element for reproducing the selection of the index, and slidably joined to the first selector arm through their respective apertures to enable each arm to move independently of the other;

a light source disposed at the point of joining of the locator arm elements and powered by the power source for producing a light beam into the translucent top element; and means for activating the light source upon each transfer of a paired coordinate onto the light table assembly.

14. The invention of claim 13 wherein each x-coordinate has only one respective index in the x-indexing system and each y-coordinate has only one respective index in the y-indexing system.

15. The invention of claim 14 wherein the number of index in the first sequence is different from the number of index in the second sequence.

16. The invention of claim 13 wherein the x-indexing system, the y-indexing system and the first and second selector elements are disposed adjacent two sides of the translucent top element.

17. The invention of claim 13 further comprising:

a plurality of guide elements fixed in the housing assembly for guiding the travel of the arm elements; and a plurality of support elements fixed in the housing assembly for supporting the arm elements as they travel.

* * * * *